(12) United States Patent
Zhang et al.

(10) Patent No.: US 11,514,404 B2
(45) Date of Patent: Nov. 29, 2022

(54) AUTOMATIC GENERATION OF DYNAMIC TIME-SLOT CAPACITY

(71) Applicant: Walmart Apollo, LLC, Bentonville, AR (US)

(72) Inventors: Shengyang Zhang, Santa Clara, CA (US); Mingang Fu, Palo Alto, CA (US); Madhavan Kandhadai Vasantham, Dublin, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 142 days.

(21) Appl. No.: 16/712,743

(22) Filed: Dec. 12, 2019

(65) Prior Publication Data

US 2020/0250626 A1   Aug. 6, 2020

Related U.S. Application Data

(60) Provisional application No. 62/799,213, filed on Jan. 31, 2019.

(51) Int. Cl.
*G06Q 10/10* (2012.01)
*G06Q 10/08* (2012.01)
*G06Q 30/02* (2012.01)

(52) U.S. Cl.
CPC ....... *G06Q 10/109* (2013.01); *G06Q 10/0838* (2013.01); *G06Q 30/0202* (2013.01)

(58) Field of Classification Search
None
See application file for complete search history.

(56) References Cited

U.S. PATENT DOCUMENTS

| 10,140,820 | B1   | 11/2018 | Zalewski et al. |              |
|------------|------|---------|-----------------|--------------|
| 10,176,463 | B2 * | 1/2019  | Abebe           | G06Q 10/1095 |
| 10,937,059 | B1 * | 3/2021  | Sudul           | G06Q 30/0267 |
| 11,126,954 | B2 * | 9/2021  | Smith           | G06Q 30/0633 |
| 2003/0110142 | A1 * | 6/2003 | Sesek          | G06Q 10/06 705/404 |
| 2008/0140515 | A1 | 6/2008 | Godwin | |
| 2013/0149675 | A1 | 6/2013 | Slone et al. | |
| 2013/0149676 | A1 | 6/2013 | Tokuda et al. | |

(Continued)

FOREIGN PATENT DOCUMENTS

WO    2012076755    6/2012

*Primary Examiner* — Folashade Anderson
(74) *Attorney, Agent, or Firm* — Bryan Cave Leighton Paisner LLP

(57) ABSTRACT

A system including one or more processors and one or more non-transitory computer-readable media storing computing instructions configured to run on the one more processors and perform: obtaining historical demand data for pickup time slots at a physical store for a first time period; training a machine learning model to create a trained model based on the historical demand data for the pickup time slots over the first time period; generating, using the trained model, a projected demand for future pickup time slots at the physical store for a second time period; generating a time-slot capacity for each of the future pickup time slots at the physical store for the second time period based at least in part on the projected demand; and sending the time-slot capacities for the future pickup time slots to the physical store. Other embodiments are described.

20 Claims, 7 Drawing Sheets

(56) References Cited

U.S. PATENT DOCUMENTS

| | | | |
|---|---|---|---|
| 2016/0092845 A1* | 3/2016 | Vogan | G06Q 10/1095 |
| | | | 705/7.19 |
| 2016/0140490 A1* | 5/2016 | Kliper | G06N 7/005 |
| | | | 705/28 |
| 2016/0283953 A1* | 9/2016 | Ettl | G06Q 10/06315 |
| 2017/0024805 A1* | 1/2017 | Tepfenhart, Jr. | G06Q 10/0836 |
| 2017/0300966 A1 | 10/2017 | Dereszynski et al. | |
| 2018/0075404 A1* | 3/2018 | Hendrickson | G06Q 50/30 |
| 2018/0349788 A1* | 12/2018 | Sarkar | G06N 3/08 |
| 2019/0012638 A1* | 1/2019 | Rajkhowa | G06Q 10/0836 |
| 2021/0233153 A1* | 7/2021 | Zhang | G06Q 30/0202 |
| 2022/0101257 A1* | 3/2022 | Wason | G06Q 30/0206 |

* cited by examiner

AUTOMATIC GENERATION OF DYNAMIC TIME-SLOT CAPACITY

CROSS-REFERENCE TO RELATED APPLICATIONS

This application claims the benefit of U.S. Provisional Application No. 62/799,213, filed Jan. 31, 2019. U.S. Provisional Application No. 62/799,213 is incorporated herein by reference in its entirety.

TECHNICAL FIELD

This disclosure is related to systems and methods for automatic generation of dynamic time-slot capacity.

BACKGROUND

Some systems allow users to select a time slot to pick up an order at a designated location. Often, a fixed number of time slots are allotted for each period of time. When all the time slots for a period of time are selected, the user may select a time slot for another period of time or may instead choose to cancel the order.

BRIEF DESCRIPTION OF THE DRAWINGS

To facilitate further description of the embodiments, the following drawings are provided in which.

Figure 1:
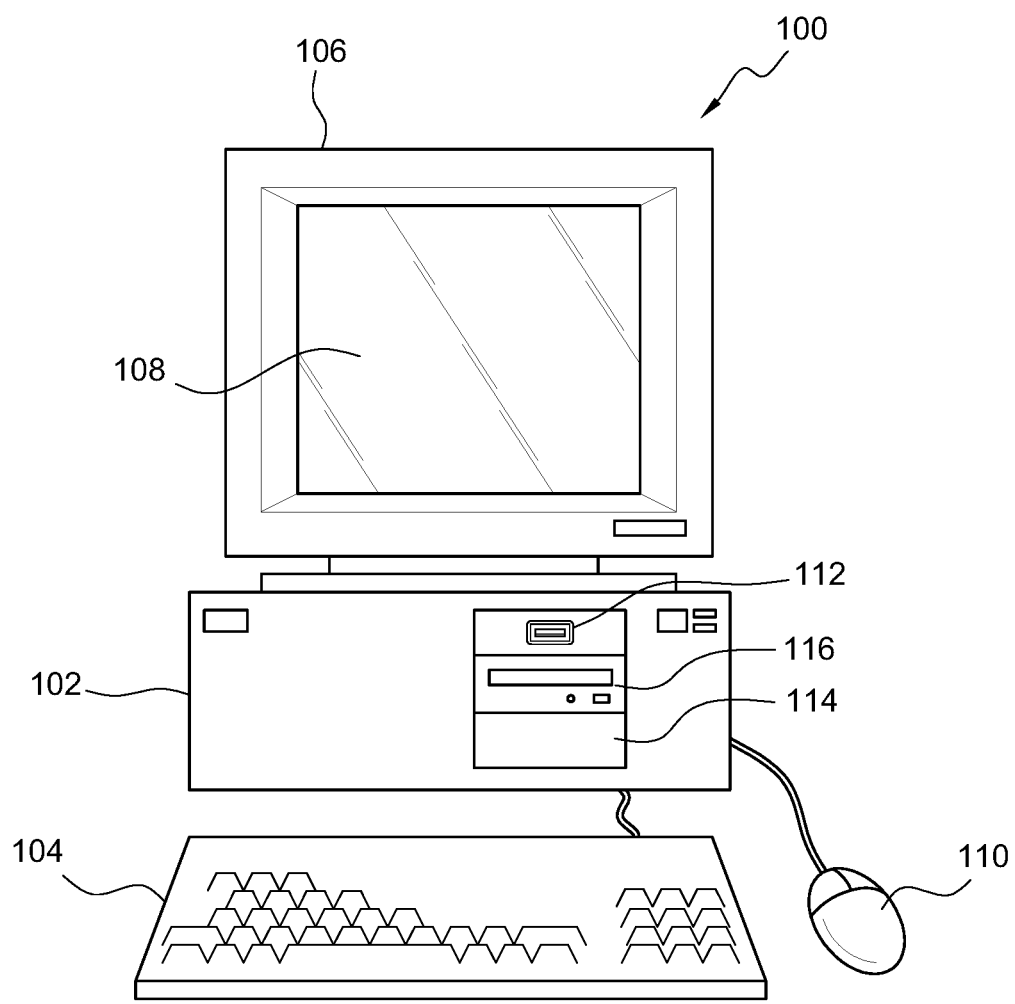
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
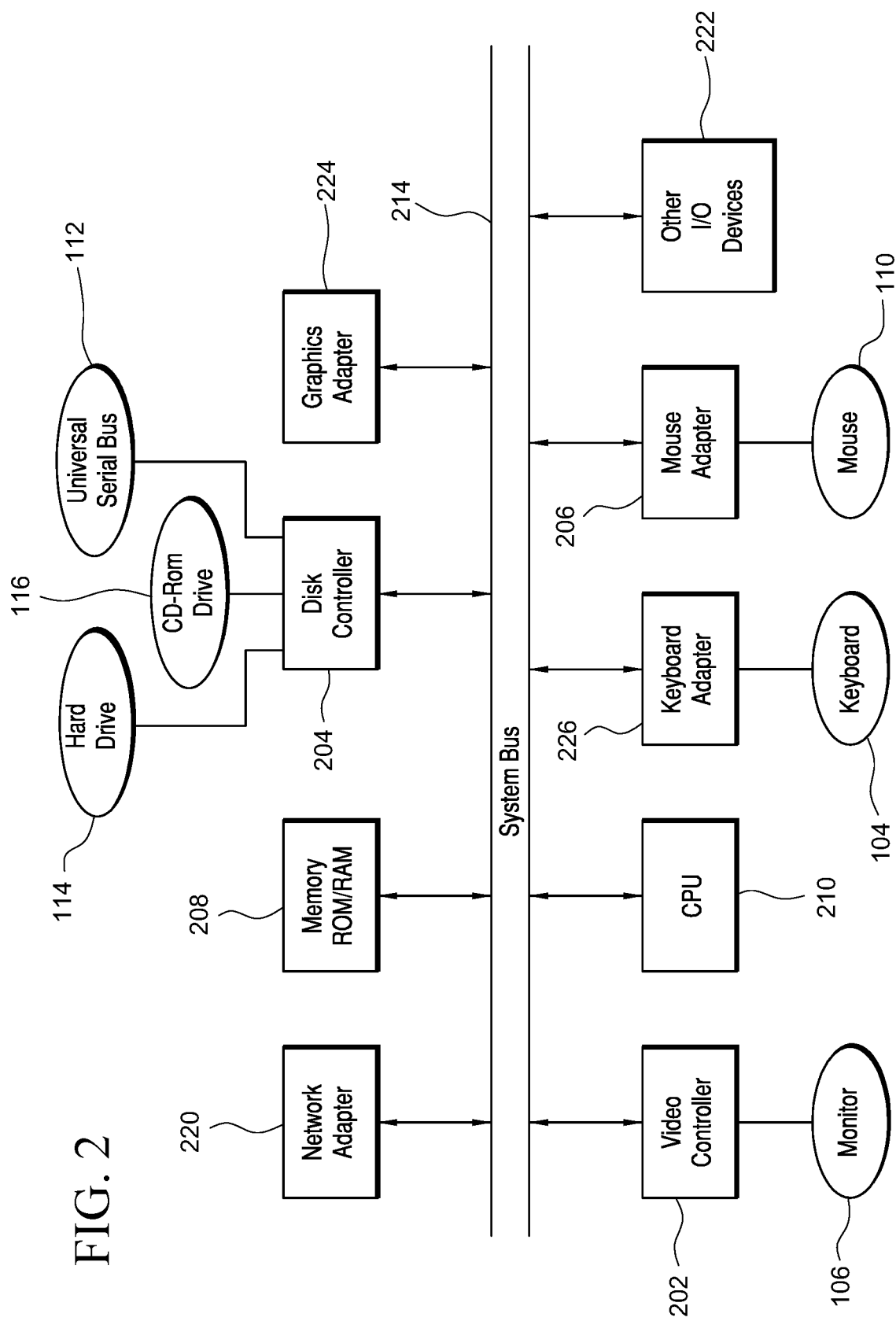
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
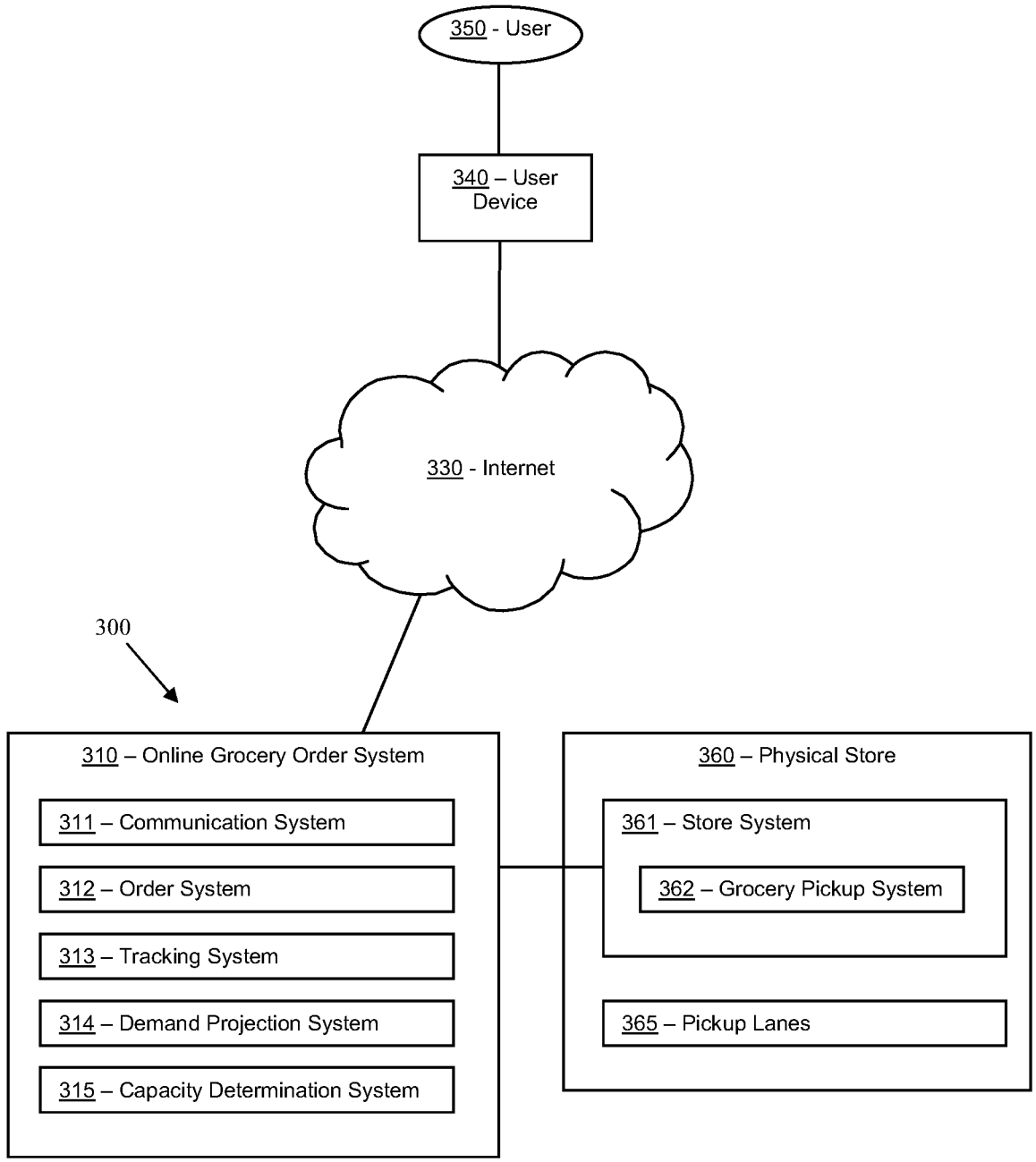
FIG. 3 illustrates a block diagram of a system that can be employed for automatic generation of dynamic time-slot capacity, according to an embodiment.

Turning ahead in the drawings, FIG. 3 illustrates a block diagram of a system 300 that can be employed for automatic generation of dynamic time-slot capacity, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include an online grocery order system 310 and/or a store system 361. Online grocery order system 310 and/or store system 361 can each be a computer system, such as computer system 100 (FIG. 1), as described above, and can each be a single computer, a single server, or a cluster or collection of computers or servers, or a cloud of computers or servers. In another embodiment, a single computer system can host online grocery order system 310 and/or store system 361. Additional details regarding online grocery order system 310 and/or store system 361 are described herein.

In some embodiments, online grocery order system 310 can be in data communication through Internet 330 with one or more user devices, such as a user device 340. In some embodiments, user device 340 can be used by users, such as a user 350. In many embodiments, online grocery order system 310 can host one or more websites and/or mobile application servers. For example, online grocery order system 310 can host a website, or provide a server that interfaces with a mobile application on user device 340, which can allow users to browse and/or search for items (e.g., products, grocery items), to add items to an electronic cart, to purchase items, and/or request grocery pickup, in addition to other suitable activities.

In some embodiments, an internal network that is not open to the public can be used for communications between online grocery order system 310 and store system 361 within system 300. In these or other embodiments, operators and/or administrators of system 300 can manage system 300, the processor(s) of system 300, and/or the memory storage unit(s) of system 300 using the input device(s) and/or display device(s) of system 300, or portions thereof in each case.

In certain embodiments, the user devices (e.g., user device 340) can be desktop computers, laptop computers, a mobile device, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, online grocery order system 310 and/or store system 361 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to online grocery order system 310 and/or store system 361 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of online grocery order system 310 and/or store system 361. In a similar manner, the processors and/or the non-transitory computer-readable media can be local and/or remote to each other.

Meanwhile, in many embodiments, online grocery order system 310 and/or store system 361 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between online grocery order system 310, store system 361, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In several embodiments, online grocery order system 310 can be in data communication with multiple store systems, which can include store system 361. In several embodiments, each store system (e.g., 361) can be located in a different physical store, such as a physical store 360. In many embodiments, the physical stores (e.g., 360) each can be a brick-and-mortar store that is associated (e.g., operated by a common business entity or entities under common control) with online grocery order system 310. In a number of embodiments, physical store 360 can be a grocery store or a larger store (e.g., a super store) that include a grocery store or grocery department. In other embodiments, physical store 360 can be a department store or other retail store that does not sell groceries. In many embodiments, online grocery order system 310 can allow a user (e.g., 350) to order items that are sold at physical store 360, and allow the user (e.g., 350) to select a time slot in the future, such as later in the day, to pick up the items in the order from physical store 360. In some embodiments, store system 361 can be a distributed system that includes one or more systems in each of the physical stores (e.g., 360). In other embodiments, store system 361 can be a centralized system that communicates with systems in the physical stores (e.g., 360).

In many embodiments, online grocery order system 310 can include a communication system 311, an order system 312, a tracking system 313, a demand projection system 314, and/or a capacity determination system 315. In several embodiments, store system 361 can include a grocery pickup system 362. In many embodiments, the systems of online grocery order system 310 and/or store system 361 can be modules of computing instructions (e.g., software modules) stored at non-transitory computer readable media that operate on one or more processors. In other embodiments, the systems of online grocery order system 310 and/or store system 361 can be implemented in hardware. Online grocery order system 310 and/or store system 361 each can be a computer system, such as computer system 100 (FIG. 1), as described above, and can be a single computer, a single server, or a cluster or collection of computers or servers, or a cloud of computers or servers. In another embodiment, a single computer system can host online grocery order system 310 and/or store system 361. Additional details regarding online grocery order system 310 and/or store system 361 and the components thereof are described herein.

In several embodiments, online grocery order system 310 can receive an order for pickup from a user (e.g., 350), such as by using order system 312 of online grocery order system 310. In some embodiments, online grocery order system 310 can allow user 350 to select a pickup time slot (e.g., an hour-long window of time) during which the user plans to pick up the order. For example, physical store 360 can allow pickup between 8 am and 8 pm, and can partition these hours into one-hour pickup time slots. Other lengths of time slots (e.g., ten minutes, twenty minutes, half hour, forty minutes, 1.5 hours, 2 hours, etc.) can be used in other examples. Physical store 360 can allow a certain number of pickups during each pickup time slot to be scheduled. For example, for a 10 am-11 am pickup time slot, the maximum number of pickups that can be scheduled can be set to 8, such that once 8 customers have scheduled a pickup for the 10 am-11 am pickup time slot, the 10 am-11 am pickup time slot will no longer be an available pickup time slot for additional customers trying to schedule a pickup. This maximum number of pickups allowed for a time slot can be referred to as a "time-slot capacity," or simply "capacity." The number of pickups actually scheduled to a time slot can be referred to as the "demand" or "actual demand" for the time slot.

In some approaches, the time-slot capacity could be a predetermined number of slots that was used for all pickup time slots. For example, each time slot of the day could have a time-slot capacity of 8. In other approaches, the time-slot capacity could be set to a higher number during certain times, such as time slots from 3 pm to 7 pm. In still other approaches, the time-slot capacity could be adjusting using hard-coded business rules that increase or decrease the capacity for a particular time slot if certain conditions were satisfied over time. For example, the capacity for a time slot could be increased if demand for the time slot on average, or for a certain number of occurrences, meets or exceeds a certain predetermined percentage (e.g., 80%, 85%, 90%, 95%, 100%) of the capacity for a predetermined amount of time (e.g., one week, two weeks, three weeks, four weeks, etc.). For example, if the demand, on average for a particular time slot, meets or exceeds 85% of the capacity for two weeks, the capacity for that particular time slot can be increased. As another example, if the demand for a time slot meets 100% of the capacity on at least three occasions in a one-week period, the capacity for the time slot can be increased. Similarly, the capacity for a time slot could be decreased if demand for the time slot on average, or for a certain number of occurrences, falls below a certain predetermined percentage (e.g., 50%, 55%, 60%, 65%) of the capacity for a predetermined amount of time (e.g., one week, two weeks, three weeks, four weeks, etc.).

Each physical store (e.g., 360) has limited resources to pick and dispense orders. For example, a store can have a certain number of employees scheduled each hour to pick and/or dispense orders. Accordingly, a time-slot capacity can be set for each time slot, such that the number of scheduled pickups for each time slot can be fulfilled with the available resources. If the demand for a time slot exceeds capacity, some of the customers that were unable to schedule a pickup for that time slot can reschedule for another pickup time slot. However, many customers will not schedule for another pickup time slot, but will instead choose to shop at a competitor, who may or may not offer pickup services. During a two-week time frame at 2,127 that offered grocery pickup, the total number of one-hour pickup time slots across the stores was 298,351. Of these time slots, approximately 96,000 of them were fully booked, meaning that the actual demand met or exceeded the capacity about 32% of the time. In these fully booked time slots, the demand was likely higher than the capacity for at least some of the time slots, but the demand above the capacity is unknown, because once the time slot was fully booked, the customers were not presented the option of selecting that fully booked time slot. If the demand, on average, exceeded the capacity by one order per time slot, and the average revenue per order was $108, the loss of sales in the two-week period could have been $10,368,000. Accordingly, setting the time-slot capacity above the demand can advantageously allow additional sales revenue.

However, setting the time-slot capacity too high above the demand can waste resources. The amount of resources to meet the demand can be scheduled before the actual demand is known. For example, if the time-slot capacity is set to a certain amount, such as 20, for a time slot, the physical store can schedule a certain number of employees to work in picking and dispensing orders to accommodate this time-slot capacity. Work schedules for employees are often planned at least a week in advance. If the actual demand is far below the time-slot capacity that was set, these the time these employees are available but unused during the time slot can be wasted. Accordingly, selecting an appropriate time-slot capacity can beneficially allow an increase in sales revenue while simultaneously preventing wasted resources. In many embodiments, the techniques described herein can be used to dynamically set the time-slot capacity for each time slot in a manner that both increases sales revenue and prevents wasted resources.

After the order has been received at online grocery order system 310, the order can be sent to store system 361, to allow associates at physical store 360 to pick the items in the order and assemble the order for pickup. Once the order has been picked and assembled, store system 361 can notify online grocery order system 310. In many embodiments, online grocery order system 310 can send a message to user 350, such as by using communication system 311 of online grocery order system 310, to allow user 350 to check-in, which indicates that user 350 is starting to travel to physical store 360 to pick up the order.

In many embodiments, once user 350 has checked in using user device 340, online grocery order system can track the location of user device 340 and user 350, such as by using a tracking system 313 of online grocery order system 310. When a user (e.g., 350) arrives at physical store 360, the user can park a vehicle of the user in one of pickup lanes 365 at physical store 360. In several embodiments, physical store 360 can include one or more pickup lanes 365.

Actual demand for pickup time slots is dynamic and variable. The reasons for variations in demand are numerous, and many of these reasons are hard for the physical store to affect or control. Accordingly, it can be difficult to predict what the actual demand for pickup time slots will be, which can make conventional subjective estimates unreliable. This difficulty in predicting demand can lead to time-slot capacities that are too low for some of the time slots and/or too high for other time slots, which can result in less sales revenue and/or wasted resources.

In many embodiments, users can order delivery orders, which can be treated by physical store 360 similarly to customer pickup orders. For delivery orders, a user (e.g., 350) can place an order, and the order can be picked up by a delivery driver, which can deliver the order to the user (e.g., at a residence of the user). The pickup process can be treated similarly in a delivery order to that of a pickup order, as the delivery driver can check-in and come to pick lanes 365 of physical store 360 for the order to be dispensed.

Figure 4:
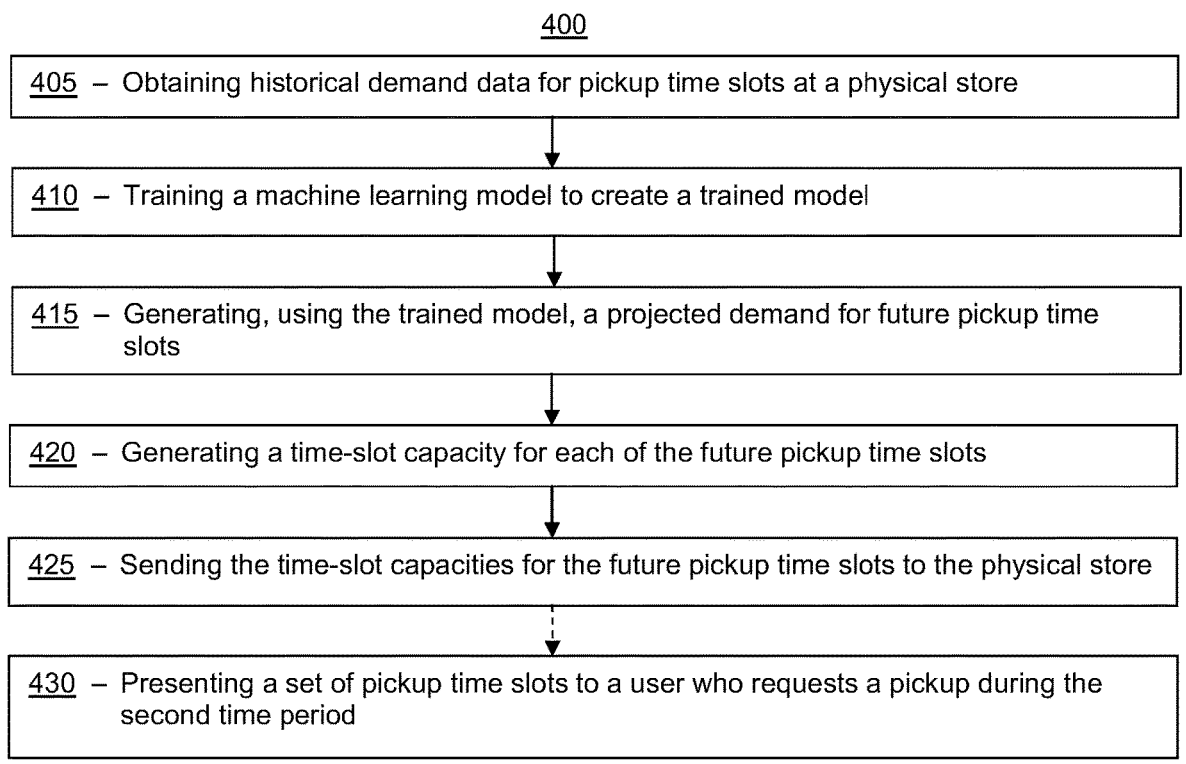
FIG. 4 illustrates a flow chart for a method, according to an embodiment.

Turning ahead in the drawings, FIG. 4 illustrates a flow chart for a method 400, according to an embodiment. In some embodiments, method 400 can be a method of automatic generation of dynamic time-slot capacity. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, online grocery order system 310 (FIG. 3) and/or store system 361 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as online grocery order system 310 (FIG. 3) and/or store system 361 (FIG. 3). The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 405 of obtaining historical demand data for pickup time slots at a physical store for a first time period. The physical store can be similar or identical to physical store 360 (FIG. 3). In some embodiments, the historical demand data can be used as training data in block 410, described below. In a number of embodiments, the first time period can be approximately four weeks. In other embodiments, the first time period can be two weeks, three weeks, one month, five weeks, six weeks, seven weeks, eight weeks, two months, nine weeks, ten weeks, eleven weeks, twelve weeks, three months, or another suitable amount of time for training data. In many embodiments, the demand for a pickup time slot in the historical demand data can be the number of scheduled pickups for the pickup time slot. As described above, the actual demand can exceed the number of scheduled pickups when the number of scheduled pickups was the same as the time-slot capacity (e.g., the time slot was fully booked). In other embodiments, the demand for a pickup time slot in the historical demand data can represent actual demand. For example, in some embodiments, the order system (e.g., 312 (FIG. 3))

In several embodiments, method 400 also can include a block 410 of training a machine learning model to create a trained model based on the historical demand data for the pickup time slots over the first time period. In a many embodiments, the machine learning model can include a recurrent neural network model that includes a long short-term memory (LSTM) cell. In many embodiments, the recurrent neural network can be a suitable conventional recurrent neural network, and/or the LSTM cell can be a suitable conventional LSTM cell. In other embodiments, the machine learning model can be another suitable machine learning approach.

Figure 5:
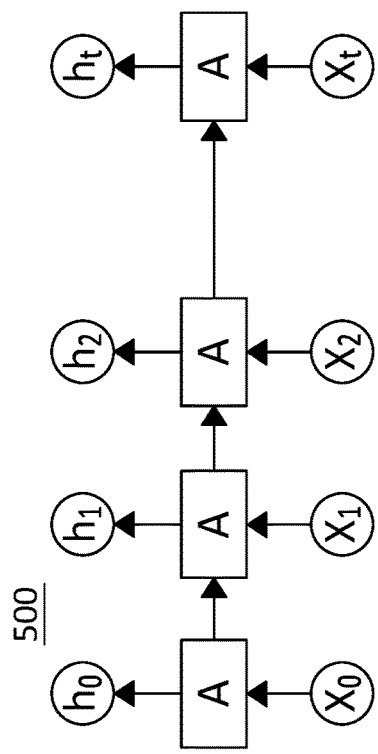
FIG. 5 illustrates a block diagram of a recurrent neural network that includes an LSTM cell.
Figure 5:
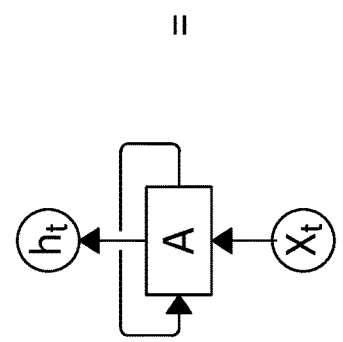

Turning ahead in the drawings, FIG. 5 illustrates a block diagram of a recurrent neural network 500 that includes an LSTM cell (denoted "A"). Recurrent neural network 500 is merely exemplary and embodiments of the recurrent neural network are not limited to the embodiments presented herein. The recurrent neural network model can be employed in many different embodiments or examples not specifically depicted or described herein. In many embodiments, recurrent neural network model 500 can include time steps t, and output from each step can become input at the next step. Thus, the examples shown on each side of the equal sign in FIG. 5 are different representations of the same recurrent neural network, but the example on the left is collapsed for all times t, and the example on the right is expanded to show each time t. In several embodiments, recurrent neural network 500 can be trained using the set of input vectors to derive output vectors, in which the output term at a time step t−1 becomes the input term at a time step t. At each time step, recurrent neural network model 500 can include an input term $x_t$ and an output term $h_t$. As described above, in many embodiments, output term $h_{t-1}$ at time step t−1 becomes input term $x_t$ at time step t. For example, output term $h_0$ at time step t=0 becomes input term $x_1$ at time step t=1.

During training, recurrent neural network 500 can take the training data as input. In several embodiments, recurrent neural network 500 can compute a sequence of hidden states ($h_0, \ldots, h_T$) by iterating through a recurrence relation in recurrent neural network 500 for time steps t=0 to T. Specifically, at each time step t, recurrent neural network 500 can receive a new input, $x_t$, and the long-term and working memories of recurrent neural network 500 within LSTM cell A can be passed on from the previous time step t−1. In many embodiments, LSTM cell A can be a suitable conventional LSTM cell. The LSTM cell A can be similar or identical to LSTM cell A shown in FIGS. 6 and 7(a)-(d), described below.

Figure 6:
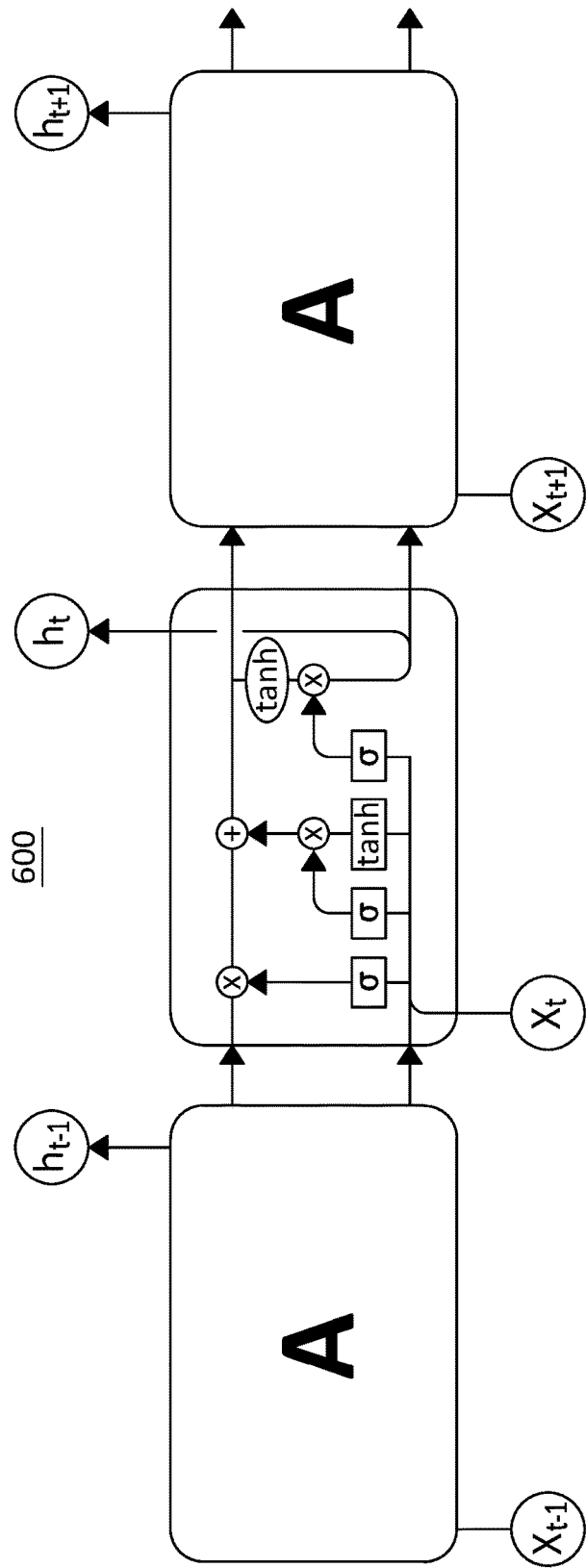
FIG. 6 illustrates a block diagram of a portion of a recurrent neural network for time steps, showing details of the LSTM cell of FIG. 5 for a time step.

Turning ahead in the drawings, FIG. 6 illustrates a block diagram of a portion 600 of recurrent neural network 500 for time steps t−1, t, and t+1, showing details of LSTM cell A for time step t. LSTM cell A is merely exemplary and embodiments of the LSTM cell are not limited to the embodiments presented herein. The LSTM cell can be employed in many different embodiments or examples not specifically depicted or described herein. In many embodiments, LSTM cell A can provide a deep learning method that is suitable for time series data. LSTM cell A can consider historical data, including giving weight to historical data that is more recent data than historical data that is less recent. As shown in FIG. 6, at each time step t, LSTM can receive input $x_t$ and generate an output term $h_t$. Within LSTM cell A, there can be a forget gate layer, an input gate layer, an cell state layer, and an output gate layer, the details of which are shown in FIGS. 7(a)-(d), respectively, described below.

Figure 7A:
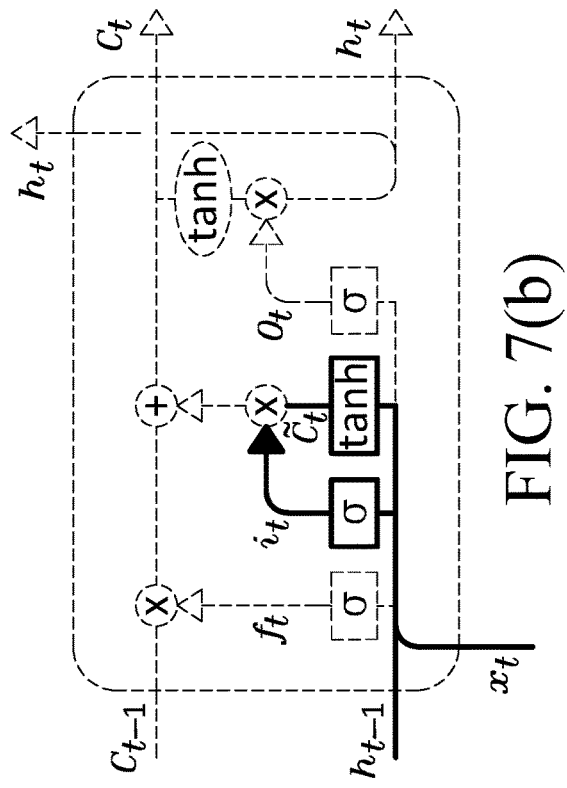
FIG. 7(a) illustrates a block diagram of the LSTM cell of FIG. 5 with a focus on a forget gate layer of the LSTM cell of FIG. 5.

Turning ahead in the drawings, FIG. 7(a) illustrates a block diagram of LSTM cell A with a focus on a forget gate layer of LSTM cell A. In many embodiments, the forget gate $f_t$ can be generated at time step t as follows:

$$f_t = \sigma(W_f[h_{t-1}, x_t] + b_f),$$

where σ is the sigmoid activation function, the $W_f$ matrix represents parameters learned during training in the forget gate layer, $h_{t-1}$ represents the hidden state from the previous time step t−1, $x_t$ is the input, and $b_f$ is a bias constant for the forget gate layer.

Figure 7B:
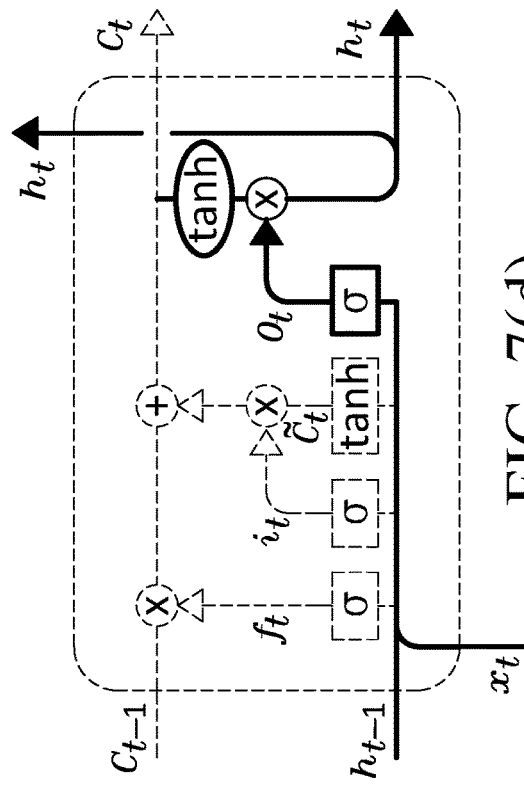
FIG. 7(b) illustrates a block diagram of the LSTM cell of FIG. 5 with a focus on an input gate layer of the LSTM cell of FIG. 5.

Turning ahead in the drawings, FIG. 7(b) illustrates a block diagram of LSTM cell A with a focus on an input gate layer of LSTM cell A. In many embodiments, the input gate $i_t$ can be generated at time step t as follows:

$$i_t = \sigma(W_i[h_{t-1}, x_t] + b_i),$$

where σ is the sigmoid activation function, the $W_i$ matrix represents parameters learned during training in the input gate layer, $h_{t-1}$ represents the hidden state from the previous time step t−1, $x_t$ is the input, and $b_i$ is a bias constant for the input gate layer. Additionally, an internal cell state term $\tilde{C}_t$ can be calculated as follows:

$$\tilde{C}_t = \tan h(W_C[h_{t-1}, x_t] + b_C),$$

where tan h is the hyperbolic tangent function, the $W_C$ matrix represents parameters learned during training for the cell state in the input gate layer, $h_{t-1}$ represents the hidden state from the previous time step t−1, $x_t$ is the input, and $b_i$ is a bias constant for the cell state.

Figure 7C:
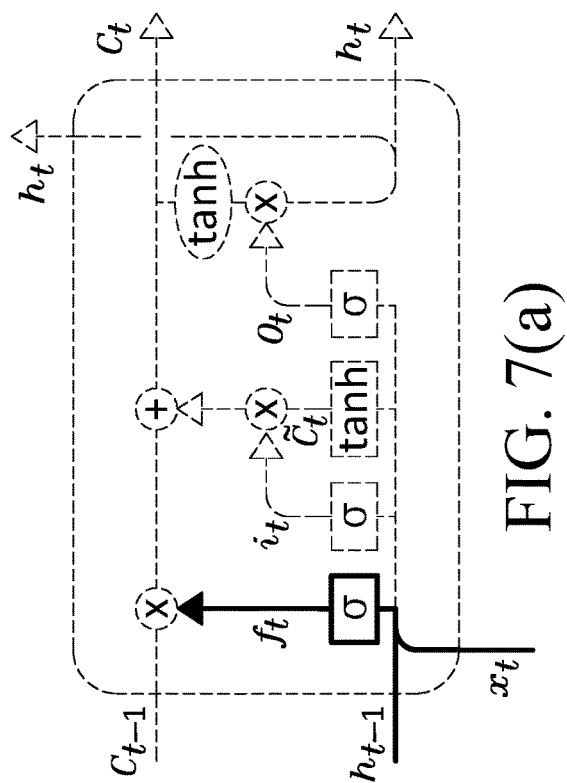
FIG. 7(c) illustrates a block diagram of the LSTM cell of FIG. 5 with a focus on a cell state layer of the LSTM cell of FIG. 5.

Turning ahead in the drawings, FIG. 7(c) illustrates a block diagram of LSTM cell A with a focus on a cell state layer of LSTM cell A. In many embodiments, the cell state $C_t$ can be generated at time step t as follows:

$$C_t = f_t \times C_{t-1} + i_t \times \tilde{C}_t,$$

where $f_t$ is the forget gate, $i_t$ is the input gate, $C_{t-1}$ is the cell state for the previous time step t−1, and $\tilde{C}_t$ is the internal cell state term.

Figure 7D:
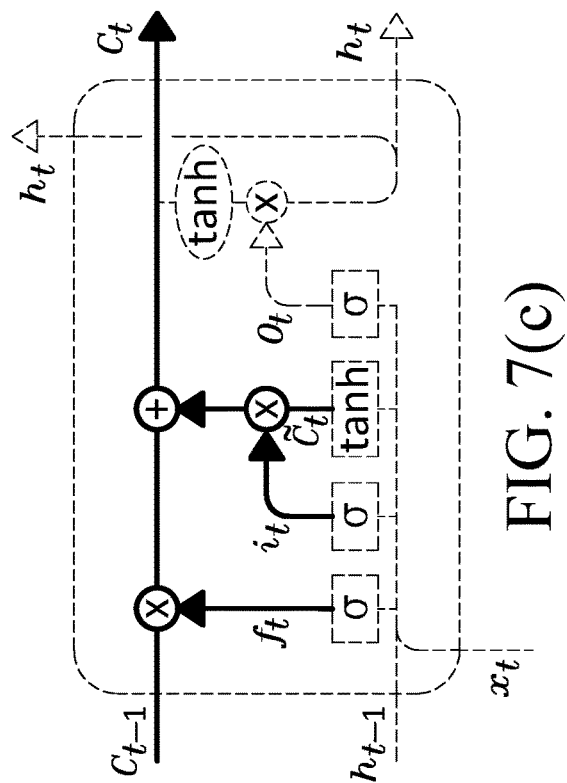
FIG. 7(d) illustrates a block diagram of the LSTM cell of FIG. 5 with a focus on an output gate layer of the LSTM cell of FIG. 5.

Turning ahead in the drawings, FIG. 7(d) illustrates a block diagram of LSTM cell A with a focus on an output gate layer of LSTM cell A. In many embodiments, the output gate $o_t$ can be generated at time step t as follows:

$$o_t = \sigma(W_o[h_{t-1}, x_t] + b_o),$$

where σ is the sigmoid activation function, the $W_o$ matrix represents parameters learned during training in the output gate layer, $h_{t-1}$ represents the hidden state from the previous time step t−1, $x_t$ is the input, and $b_o$ is a bias constant for the output gate layer. Additionally, the hidden state $h_t$ can be calculated as follows:

$$h_t = o_t \times \tan h(C_t),$$

where tan h is the hyperbolic tangent function, $C_t$ is the cell state, and $o_t$ is the output gate layer.

In many embodiments, the parameters can be learned and tuned during training, based on the sequence of inputs. In several embodiments, the historical demand data can be represented as a set of input vectors as input to the machine learning model. In a number of embodiments, each input vector of the set of input vectors can represent a demand at the physical store for a single day in the first time period. In various embodiments, the each input vector of the set of input vectors can include a set of elements each representing a number of pickups that were scheduled at the physical store for a different one of the pickup time slots that occurred during the single day. For example, the input data for four weeks can be as shown in Tables 1-4 below, each of which represents a different week from a four-week period from Aug. 26, 2018 to Sep. 22, 2018, showing the demand data (e.g., number of scheduled pickups) for each of the time slots at an exemplary single physical store. The demand data here is not actual data from an actual physical store, and is provided here only for illustrative purposes. Each of the time slots (e.g., 800) listed in Tables 1-4 represents the beginning time of a one-hour time slot (e.g., 8 am-9 am).

TABLE 1

| Time Slot | \multicolumn{7}{c}{Day} | | | | | | |
| --- | --- | --- | --- | --- | --- | --- | --- |
| | Aug. 26, 2018 | Aug. 27, 2018 | Aug. 28, 2018 | Aug. 29, 2018 | Aug. 30, 2018 | Aug. 31, 2018 | Sep. 1, 2018 |
| 800 | 5 | 1 | 1 | 4 | 3 | 2 | 1 |
| 900 | 4 | 3 | 7 | 3 | 5 | 1 | 1 |
| 1000 | 6 | 2 | 2 | 2 | 6 | 5 | 3 |
| 1100 | 5 | 2 | 5 | 1 | 4 | 6 | 8 |
| 1200 | 2 | 2 | 5 | 1 | 4 | 3 | 3 |
| 1300 | 1 | 2 | 7 | 4 | 5 | 9 | 2 |
| 1400 | 4 | 1 | 3 | 2 | 2 | 4 | 1 |
| 1500 | 2 | 2 | 3 | 6 | 1 | 4 | 5 |
| 1600 | 8 | 4 | 4 | 3 | 3 | 9 | 3 |
| 1700 | 5 | 3 | 5 | 5 | 1 | 3 | 1 |
| 1800 | 1 | 1 | 0 | 0 | 6 | 4 | 2 |
| 1900 | 8 | 1 | 2 | 3 | 4 | 3 | 4 |

TABLE 2

| Time Slot | \multicolumn{7}{c}{Day} | | | | | | |
| --- | --- | --- | --- | --- | --- | --- | --- |
| | Sep. 2, 2018 | Sep. 3, 2018 | Sep. 4, 2018 | Sep.,5, 2018 | Sep. 6, 2018 | Sep. 7, 2018 | Sep. 8, 2018 |
| 800 | 4 | 2 | 4 | 1 | 2 | 6 | 1 |
| 900 | 4 | 2 | 2 | 2 | 1 | 8 | 2 |
| 1000 | 7 | 2 | 0 | 0 | 7 | 2 | 1 |
| 1100 | 5 | 6 | 4 | 5 | 3 | 1 | 0 |
| 1200 | 1 | 7 | 1 | 3 | 5 | 3 | 1 |
| 1300 | 4 | 8 | 2 | 1 | 2 | 3 | 5 |

TABLE 2-continued

| | Day | | | | | | |
|---|---|---|---|---|---|---|---|
| Time Slot | Sep. 2, 2018 | Sep. 3, 2018 | Sep. 4, 2018 | Sep.,5, 2018 | Sep. 6, 2018 | Sep. 7, 2018 | Sep. 8, 2018 |
| 1400 | 1 | 2 | 1 | 3 | 1 | 4 | 0 |
| 1500 | 7 | 2 | 4 | 3 | 7 | 8 | 2 |
| 1600 | 7 | 2 | 4 | 5 | 3 | 10 | 6 |
| 1700 | 6 | 1 | 6 | 4 | 8 | 2 | 1 |
| 1800 | 0 | 1 | 2 | 11 | 4 | 4 | 0 |
| 1900 | 3 | 2 | 1 | 2 | 3 | 1 | 0 |

TABLE 3

| | Day | | | | | | |
|---|---|---|---|---|---|---|---|
| Time Slot | Sep. 9, 2018 | Sep. 10, 2018 | Sep. 11, 2018 | Sep. 12, 2018 | Sep. 13, 2018 | Sep. 14, 2018 | Sep. 15, 2018 |
| 800 | 1 | 1 | 5 | 6 | 2 | 6 | 8 |
| 900 | 1 | 1 | 5 | 1 | 4 | 1 | 6 |
| 1000 | 1 | 1 | 3 | 4 | 0 | 8 | 1 |
| 1100 | 7 | 2 | 0 | 4 | 6 | 3 | 4 |
| 1200 | 0 | 1 | 1 | 1 | 2 | 10 | 2 |
| 1300 | 1 | 1 | 1 | 7 | 6 | 2 | 9 |
| 1400 | 3 | 3 | 3 | 1 | 4 | 4 | 1 |
| 1500 | 1 | 3 | 5 | 2 | 2 | 2 | 4 |
| 1600 | 3 | 5 | 1 | 4 | 6 | 4 | 1 |
| 1700 | 3 | 3 | 4 | 7 | 1 | 1 | 3 |
| 1800 | 3 | 1 | 1 | 1 | 3 | 4 | 1 |
| 1900 | 5 | 4 | 4 | 5 | 1 | 1 | 2 |

TABLE 4

| | Day | | | | | | |
|---|---|---|---|---|---|---|---|
| Time Slot | Sep. 16, 2018 | Sep. 17, 2018 | Sep. 18, 2018 | Sep. 19, 2018 | Sep. 20, 2018 | Sep. 21, 2018 | Sep. 22, 2018 |
| 800 | 5 | 4 | 5 | 3 | 4 | 2 | 5 |
| 900 | 5 | 6 | 3 | 1 | 2 | 4 | 3 |
| 1000 | 2 | 7 | 1 | 0 | 3 | 1 | 3 |
| 1100 | 1 | 2 | 3 | 6 | 8 | 6 | 3 |
| 1200 | 1 | 3 | 3 | 4 | 4 | 4 | 5 |
| 1300 | 5 | 1 | 5 | 2 | 0 | 5 | 3 |
| 1400 | 3 | 7 | 3 | 6 | 6 | 2 | 2 |
| 1500 | 1 | 4 | 5 | 4 | 1 | 3 | 2 |
| 1600 | 7 | 1 | 2 | 1 | 6 | 1 | 2 |
| 1700 | 7 | 2 | 2 | 1 | 6 | 1 | 0 |
| 1800 | 3 | 3 | 2 | 7 | 5 | 1 | 1 |
| 1900 | 1 | 6 | 1 | 1 | 2 | 2 | 3 |

In many embodiments, the input $x_t$ at each time step t can be a vector that includes the data for the twelve time slots for a day. For example, the input at time step t=0, $x_0$, can be for the first day, Aug. 26, 2018, which can be a vector that includes the demand data for each time slot of the day, such as:

$x_0$=[5,4,6,5,2,1,4,2,8,5,1,8].

During training, the output for time step t=0 can be trained to be the input for the following time step t=1, $x_1$, which can be the demand for the following day, Aug. 27, 2018. The training can be performed with the demand data for each of the first twenty-seven days being used as input, and the demand data for each of the last twenty-seven days being used as output for training, train the machine learning model. The demand data for the first day of the four-week period can be used for input without being used for output, and the demand data for the last day of the four-week period can be used for output training, without being used as input.

Returning in the drawings to FIG. 4, in a number of embodiments, method 400 additionally can include a block 415 of generating, using the trained model, a projected demand for future pickup time slots at the physical store for a second time period. In a number of embodiments, the second time period can be approximately one week. In other embodiments, the first time period can be five days, ten days, fourteen days, or another suitable amount of time for generating the projected demand. In many embodiments, the trained model generated in block 410 can be used to generate the projected demand. For example, recurrent neural network 500 (FIG. 5) can be used to generate the projected demand. In many embodiments, the output data from the last day of the training data can represent the first input to the trained model after training is complete. The output at each time step can then be fed into the trained model as input for the following time step. Each of these outputs also can represent the projected demand data for a day. For example, the first output can represent the projected demand for the next day (e.g., Sep. 23, 2018), and each subsequent output can represent the projected demand for the subsequent day.

For example, the output data for four weeks can be as shown in Table 5 below, which represents a one-week period from Sep. 23, 2018 to Sep. 29, 2018, showing the projected demand for each of the time slots at the exemplary single physical store for the input data shown in Tables 1-4 above. As in Tables 1-4, each of the time slots (e.g., 800) listed in Table 5 represents the beginning time of a one-hour time slot (e.g., 8 am-9 am).

TABLE 5

| | Day | | | | | | |
|---|---|---|---|---|---|---|---|
| Time Slot | Sep. 23, 2018 | Sep. 24, 2018 | Sep. 25, 2018 | Sep. 26, 2018 | Sep. 27, 2018 | Sep. 28, 2018 | Sep. 29, 2018 |
| 800 | 8 | 3 | 6 | 7 | 6 | 2 | 7 |
| 900 | 7 | 9 | 8 | 6 | 4 | 5 | 5 |
| 1000 | 2 | 3 | 6 | 8 | 3 | 3 | 3 |
| 1100 | 5 | 3 | 5 | 5 | 3 | 3 | 5 |
| 1200 | 4 | 4 | 5 | 5 | 5 | 3 | 6 |
| 1300 | 3 | 10 | 7 | 6 | 7 | 8 | 7 |
| 1400 | 7 | 4 | 7 | 3 | 3 | 3 | 7 |
| 1500 | 8 | 11 | 3 | 6 | 8 | 5 | 9 |
| 1600 | 7 | 8 | 12 | 5 | 7 | 5 | 9 |
| 1700 | 4 | 5 | 8 | 4 | 8 | 4 | 6 |
| 1800 | 3 | 4 | 6 | 3 | 4 | 2 | 4 |
| 1900 | 7 | 4 | 3 | 6 | 6 | 4 | 11 |

In many embodiments, the output vector at each time step t can be a vector that includes the projected demand for the twelve time slots for a day. For example, the output at time step t=0 when using the trained model can be the projected demand for the first day, Sep. 23, 2018, which can be a vector that includes the projected demand for each time slot of the day, such as:

[8,7,2,5,4,3,7,8,7,4,3,7].

During use of the trained model, the output for time step t=0 can then be used as the input for the next time step t=1, $x_1$, which can be used to generate the projected demand for the following day, Sep. 24, 2018. The generation of projected demand using the trained model can proceed similarly for seven time steps representing the seven-day period. In many embodiments, the projected demand for the future time slots can be generated before the first time slot of the future time slots occurs. For example, the projected demand for Sep. 23, 2018 to Sep. 29, 2018 can be generated in the evening of Sep. 22, 2018, once the demand data for the time slots of that day has been generated, or can be generated in the morning of Sep. 23, 2018 before the first time slot occurs.

In several embodiments, method 400 further can include a block 420 of generating a time-slot capacity for each of the future pickup time slots at the physical store for the second time period based at least in part on the projected demand. In many embodiments, the time-slot capacity for the each of the future pickup time slots can represent a maximum number of pickups that can be scheduled within the each of the future pickup time slots at the physical store for the second time period. In some embodiments, the maximum number of pickups for a time slot can include a maximum combined number of customer pickups and delivery pickups at the physical store for the time slot.

In several embodiments, the projected demand generated in block 415 above can be used to generate the time-slot capacity for each of the future pickup time slots. For example, the projected demand for each of the time slots in the one-week period of Sep. 23, 2018 to Sep. 29, 2018 can be used to generate the time-slot capacity for each of the future time slots that will occur during that one-week period. In some embodiments, the time-slot capacity for each time slot can be set to the projected demand for that time slot. In other embodiments, the time-slot capacity for each time slot can be set to the sum of the projected demand for that time slot and an offset, such as 1, 2, or 3. In many embodiments, the offset can increase the time-slot capacity above the projected demand such that if the actual demand exceeds the projected demand by 1, 2, or 3, these additional pickups in the actual demand can be scheduled for that time slot.

In several embodiments, the time-slot capacity can be generated as described above, but with additional constraints, such that adjacent time slots can change gradually. For example, the time-slot capacity for adjacent time slots can be generated such that the absolute value of the difference between the time-slot capacities of adjacent time slots is not more than a predetermined number, such as 2, 3, 4, 5, 6, 7, or 8, for example. Limiting the difference between adjacent time slot-capacities can prevent drastic spikes and dips in the time-slot capacities during the day, such that the number of employees working to pick and dispense pickups can be more consistent from hour to hour during the day.

In some embodiments, block 420 of generating a time-slot capacity for each of the future pickup time slots at the physical store for the second time period based at least in part on the projected demand further can include generating the time-slot capacity for the each of the future pickup time slots at the physical store for the second time period based at least in part on predetermined capacity range constraints. In many cases, each of the physical stores (e.g., 360 (FIG. 3)) can have capacity range constraints, which can represent an upper bound and/or lower bound for the capacity. For example, a physical store can have an upper bound of 20, such that the capacity cannot be set above 20 for any time slot, and/or a lower bound of 3, such that the capacity cannot be set below 3 for any time slot.

In various embodiments, the time-slot capacity can be generated as described above, but with additional constraints, such as maintaining a total daily slot capacity for a physical store. In other words, if the total capacity for the twelve time slots for the day is 60, the total capacity can remain at 60, despite adjusting the time-slot capacity based on the projected demand.

In a number of embodiments, method 400 additionally can include a block 425 of sending the time-slot capacities for the future pickup time slots to the physical store. For example, the time-slot capacities generated in block 420 can be sent to store system 361 (FIG. 3) of physical store 360 (FIG. 3). In many embodiments, the time-slot capacities for the future pickup time slots at the physical store for the second time period can be used for scheduling a number of workers for each day of the second time period at the physical store. For example, work shifts during a day can be scheduled based on the time-slot capacities for the time slots during a day.

In several embodiments, method 400 optionally can include a block 430 of presenting a set of pickup time slots to a user who requests a pickup during the second time period, based at least in part on the time-slot capacities for the future pickup time slots. The user can be similar or identical to user 350 (FIG. 3). For example, if the user requests a pickup on Sep. 27, 2018, the time slots that are presented to the user to select can be based on the time-slot capacities generated in block 420 for the time slots during the day. In many embodiments, whether a time slot is shown as available can be based on the capacity for the time slot whether the number of scheduled pickups for the time slot has reached the capacity for the time slot.

Figure 8:
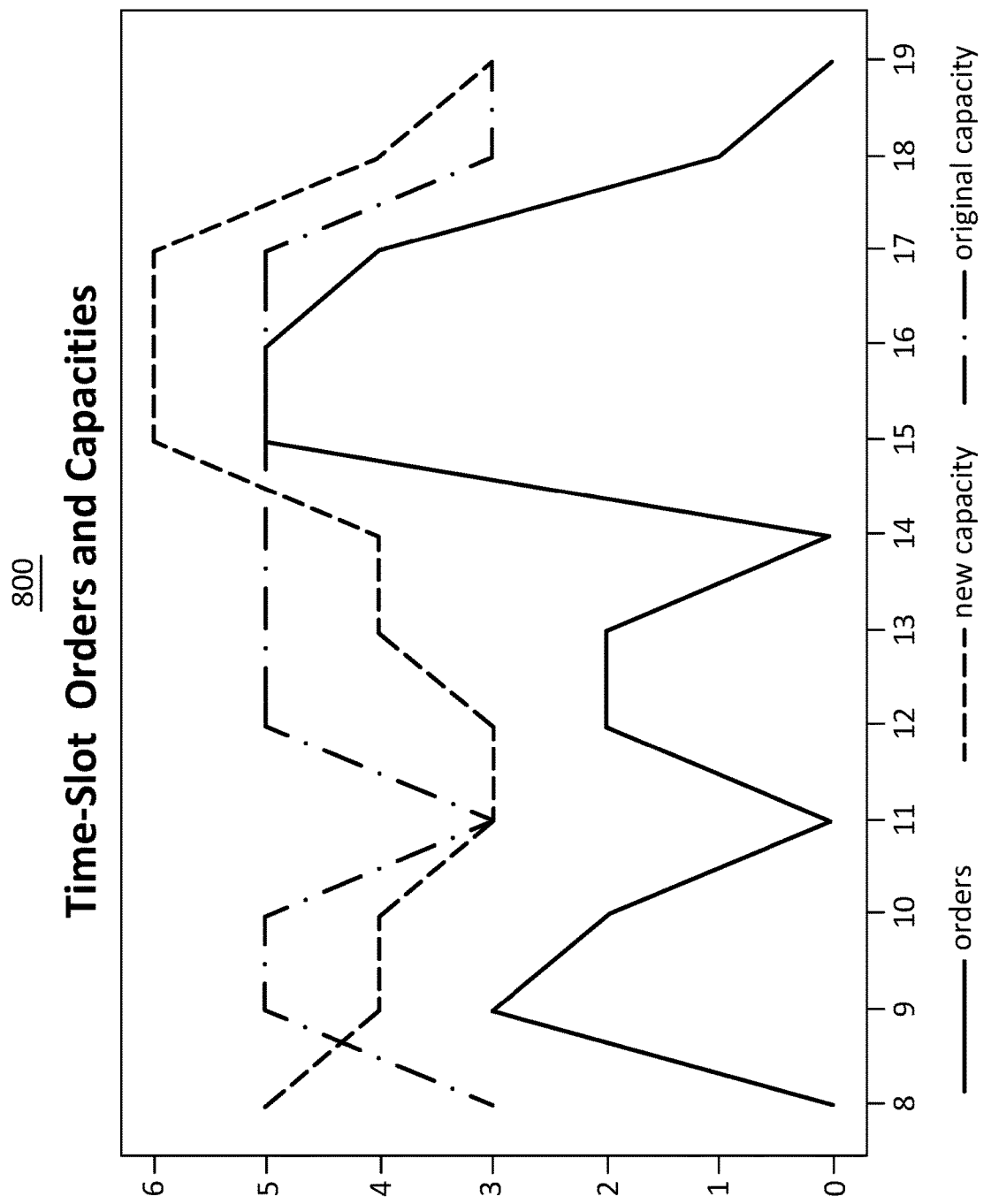
FIG. 8 illustrates a graph showing test results for automatic generation of dynamic time-slot capacity using data from a specific physical store.

Turning ahead to next drawing, FIG. 8 illustrates a graph 800 showing test results for automatic generation of dynamic time-slot capacity using data from a specific physical store. Specifically, the pickup orders occurred during a five-week time frame. The data from the first four weeks were used to train the machine learning model, as described above. The trained model was then used to generate projected demand data for the fifth week. The project demand data was used to generate new time-slot capacities, which were compared against the original capacities.

FIG. 8 shows a first plot of the original capacities that were actually used at the store for the time slots during the day. FIG. 8 also shows a second plot of the number of orders that occurred for each time slot. The number of orders can be considered the demand, but may not include all of the actual demand when a time slot is fully booked, as described above. As shown in FIG. 8, the time slots at 1500 and 1600 were fully booked. FIG. 8 also shows a third plot of the new time slot capacities that were generated based on the projected demand, using the techniques described herein. In this case, the time-slot capacities for the day were generated to redistribute the original time-slot capacities, such that the total daily slot capacity was unchanged. As shown in FIG. 8, the new time-slot capacities were different from the old time-slot capacities, and the new time-slot capacities more closely track the actual demand, while allowing a small buffer for additional demand, such as being one order above the actual demand at many times.

Additional tests were performed using a set of 546 stores that each had a minimum of six months of online grocery pickup history data and had an average utilization rate of 50% to 70%, which represents the total number of scheduled pickups at the store divided by the total capacity for the store. For these stores, the fully booked rate for the slots was 19.34% on average and the capacity utilization rate was 60.63% on average over a previous 6 month period. The techniques described herein were used based on the historical data to generate time-slot capacities for the stores for a four-week period after the six-month period. Actual demand data also was collected during the four-week period to determine whether the new time-slot capacities would result in a higher number of scheduled pickups. There were approximately 800,000 orders on average in a four week period, and the number of extra orders was 24,231 based on the new time-slot capacities. The number of missed orders was 13,025 due to the new time-slot capacities, which represents when the actual demand exceeded the new time-slot capacities. Overall, the new time-slot capacities result in a sales increase of 1.41%. Additional tuning of the time-slot capacities based on the projected demand can improve performance of the time-slot capacities to limit the number of missed orders, while not wasting resources at the physical stores.

Returning to FIG. 3, in several embodiments, communication system 311 can at least partially perform block 405 (FIG. 4) of obtaining historical demand data for pickup time slots at a physical store for a first time period, and/or block 425 (FIG. 4) of sending the time-slot capacities for the future pickup time slots to the physical store.

In several embodiments, order system 312 can at least partially perform block 430 (FIG. 4) of presenting a set of pickup time slots to a user who requests a pickup during the second time period, based at least in part on the time-slot capacities for the future pickup time slots.

In a number of embodiments, tracking system 313 can at least partially perform block 405 (FIG. 4) of obtaining historical demand data for pickup time slots at a physical store for a first time period.

In several embodiments, demand projection system 314 can at least partially perform block 410 (FIG. 4) of training a machine learning model to create a trained model based on the historical demand data for the pickup time slots over the first time period, and/or block 415 (FIG. 4) of generating, using the trained model, a projected demand for future pickup time slots at the physical store for a second time period.

In a number of embodiments, capacity determination system 315 can at least partially perform block 420 (FIG. 4) of generating a time-slot capacity for each of the future pickup time slots at the physical store for the second time period based at least in part on the projected demand.

In a number of embodiments, order queue system 362 can at least partially perform receiving the time-slot capacities sent from communication system 311 (FIG. 3) of online grocery order system 310 (FIG. 3) in block 425 (FIG. 4) of sending the time-slot capacities for the future pickup time slots to the physical store.

In many embodiments, the techniques described herein can provide a practical application and several technological improvements. In some embodiments, the techniques described herein can provide for automatic generation of dynamic time-slot capacity using specific input data and a machine learning model to provide estimates in the face of uncertain conditions. These techniques described herein can provide a significant improvement over conventional approaches of setting capacities based on subjective estimates of projected demand, such as guesses about how many users will want certain time slots. Moreover, these estimates are improvements over other possible approaches, such as setting the capacity for each time slot the same and/or adjusting based on consistent high or low demand. In many embodiments, the techniques described herein can beneficially make determinations based on dynamic information that describes current conditions and/or conditions that have occurred during the days preceding the scheduled pickup.

In many embodiments, the machine learning model can consider the actual demand data over time to generate projected demand estimates that more accurately correlate to actual demand. In many embodiments, the technique described herein can generate appropriate time-slot capacities even when there are recent surges or other unusual situations, based on the use of recent historical data.

In a number of embodiments, the techniques described herein can advantageously provide a consistent user experience by limiting the number of fully booked time slots and setting time-slot capacities that accommodate more users at their desired time slots, in the face of across varying and uncertain conditions.

In many embodiments, the techniques described herein can be used continuously at a scale that cannot be handled using manual techniques. For example, the number of monthly pickups at each store can exceed a few thousand.

In a number of embodiments, the techniques described herein can solve a technical problem that arises only within the realm of computer networks, as online grocery orders do not exist outside the realm of computer networks. Moreover, the techniques described herein can solve a technical problem that cannot be solved outside the context of computer networks. Specifically, the techniques described herein cannot be used outside the context of computer networks, in view of a lack of data, and because the machine learning model cannot be performed without a computer.

Various embodiments include a system. The system can include one or more processors and one or more non-transitory computer-readable media storing computing instructions configured to run on the one more processors and perform certain acts. The acts can include obtaining historical demand data for pickup time slots at a physical store for a first time period. The acts also can include training a machine learning model to create a trained model based on the historical demand data for the pickup time slots over the first time period. The acts additionally can include generating, using the trained model, a projected demand for future pickup time slots at the physical store for a second time period. The acts further can include generating a time-slot capacity for each of the future pickup time slots at the physical store for the second time period based at least in part on the projected demand. The acts also can include sending the time-slot capacities for the future pickup time slots to the physical store.

Several embodiments can include a method. The method can be implemented via execution of computing instructions configured to run at one or more processors and stored at one or more non-transitory computer-readable media. The method can include obtaining historical demand data for pickup time slots at a physical store for a first time period. The method also can include training a machine learning model to create a trained model based on the historical demand data for the pickup time slots over the first time period. The method further can include generating, using the trained model, a projected demand for future pickup time slots at the physical store for a second time period. The method additionally can include generating a time-slot capacity for each of the future pickup time slots at the physical store for the second time period based at least in part on the projected demand. The method also can include sending the time-slot capacities for the future pickup time slots to the physical store.

Although automatic generation of dynamic time-slot capacity has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the systems within online grocery order system 310 and/or store system 361 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
   obtaining historical demand data for numbers of scheduled pickups at pickup time slots at a physical store for a first time period comprising the pickup time slots;
   training a machine learning model to create a trained model based on the historical demand data for the numbers of scheduled pickups at the pickup time slots over the first time period;
   generating, using the trained model, a projected demand for future pickup time slots at the physical store for a second time period;
   generating a time-slot capacity for each of the future pickup time slots at the physical store for the second time period based at least in part on the projected demand;
   sending the time-slot capacities for the future pickup time slots to the physical store; and
   after the future pickup time slots have occurred, determining when actual demand exceeded the time-slot capacities to tune the machine learning model.

2. The system of claim 1, wherein the first time period is approximately four weeks.

3. The system of claim 1, wherein the machine learning model comprises a recurrent neural network model comprising a long short-term memory cell.

4. The system of claim 1, wherein:
   the historical demand data is represented as a set of input vectors as input to the machine learning model; and
   each input vector of the set of input vectors represents a demand at the physical store for a single day in the first time period.

5. The system of claim 4, wherein the each input vector of the set of input vectors comprises a set of elements each representing a number of pickups that were scheduled at the physical store for a different one of the pickup time slots that occurred during the single day.

6. The system of claim 1, wherein the computing instructions are further configured to perform:
   presenting a set of pickup time slots to a user who requests a pickup during the second time period, based at least in part on the time-slot capacities for the future pickup time slots.

7. The system of claim 1, wherein the time-slot capacity for the each of the future pickup time slots represents a maximum number of pickups that can be scheduled within the each of the future pickup time slots at the physical store for the second time period.

8. The system of claim 7, wherein the maximum number of pickups comprises a maximum combined number of customer pickups and delivery pickups at the physical store.

9. The system of claim 1, wherein generating the time-slot capacity for the each of the future pickup time slots at the physical store for the second time period further comprises:
   generating the time-slot capacity for the each of the future pickup time slots at the physical store for the second time period based at least in part on predetermined capacity range constraints.

10. The system of claim 1, wherein the time-slot capacities for the future pickup time slots at the physical store for the second time period are used for scheduling a number of workers for each day of the second time period at the physical store.

11. A method being implemented via execution of computing instructions configured to run at one or more processors and stored at one or more non-transitory computer-readable media, the method comprising:
    obtaining historical demand data for numbers of scheduled pickups at pickup time slots at a physical store for a first time period comprising the pickup time slots;
    training a machine learning model to create a trained model based on the historical demand data for the numbers of scheduled pickups at the pickup time slots over the first time period;
    generating, using the trained model, a projected demand for future pickup time slots at the physical store for a second time period;
    generating a time-slot capacity for each of the future pickup time slots at the physical store for the second time period based at least in part on the projected demand;
    sending the time-slot capacities for the future pickup time slots to the physical store; and
    after the future pickup time slots have occurred, determining when actual demand exceeded the time-slot capacities to tune the projected demand generated by the machine learning model.

12. The method of claim 11, wherein the first time period is approximately four weeks.

13. The method of claim 11, wherein the machine learning model comprises a recurrent neural network model comprising a long short-term memory cell.

14. The method of claim 11, wherein:
    the historical demand data is represented as a set of input vectors as input to the machine learning model; and
    each input vector of the set of input vectors represents a demand at the physical store for a single day in the first time period.

15. The method of claim 14, wherein the each input vector of the set of input vectors comprises a set of elements each representing a number of pickups that were scheduled at the physical store for a different one of the pickup time slots that occurred during the single day.

16. The method of claim 11 further comprising:
presenting a set of pickup time slots to a user who requests a pickup during the second time period, based at least in part on the time-slot capacities for the future pickup time slots.

17. The method of claim 11, wherein the time-slot capacity for the each of the future pickup time slots represents a maximum number of pickups that can be scheduled within the each of the future pickup time slots at the physical store for the second time period.

18. The method of claim 17, wherein the maximum number of pickups comprises a maximum combined number of customer pickups and delivery pickups at the physical store.

19. The method of claim 11, wherein generating the time-slot capacity for the each of the future pickup time slots at the physical store for the second time period further comprises:
generating the time-slot capacity for the each of the future pickup time slots at the physical store for the second time period based at least in part on predetermined capacity range constraints.

20. The method of claim 11, wherein the time-slot capacities for the future pickup time slots at the physical store for the second time period are used for scheduling a number of workers for each day of the second time period at the physical store.

* * * * *